May 2, 1939.  V. HAIGH  2,156,336
AUTOMATIC TRANSMISSION
Filed Aug. 26, 1933  3 Sheets-Sheet 2
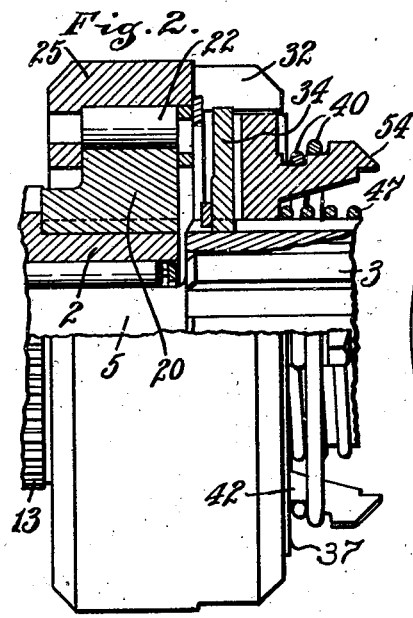
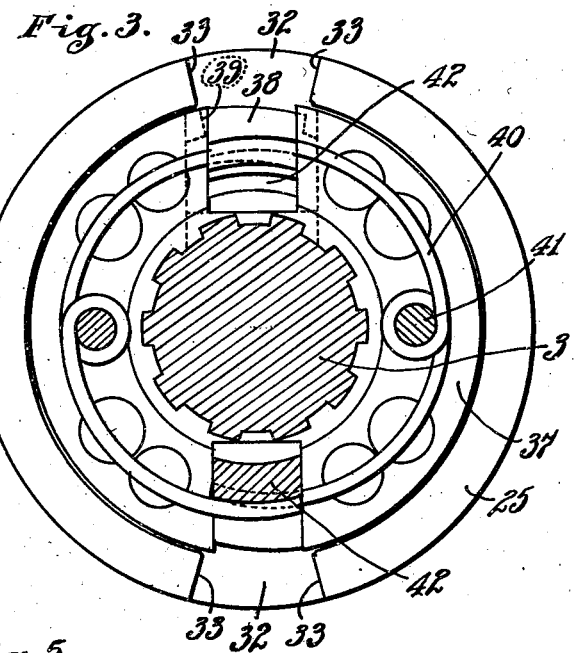
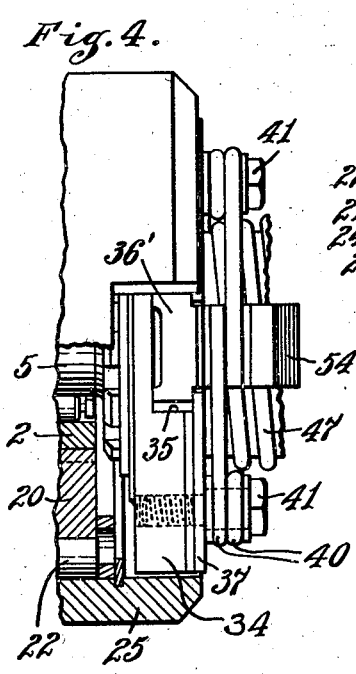
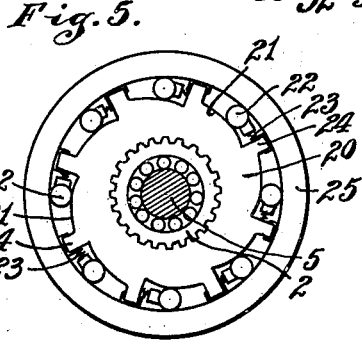
INVENTOR:
Vaughn Haigh,
BY
ATTORNEYS

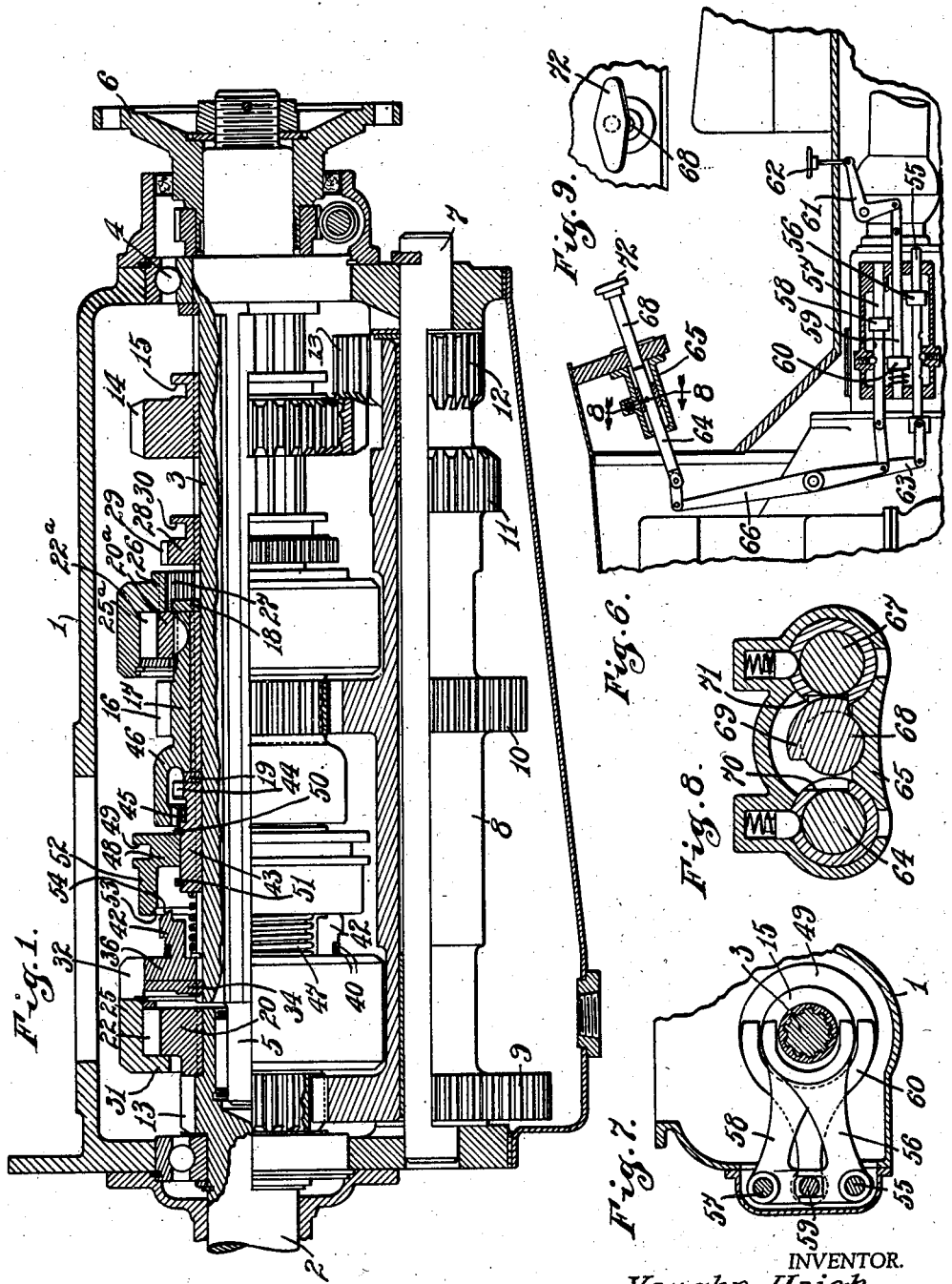

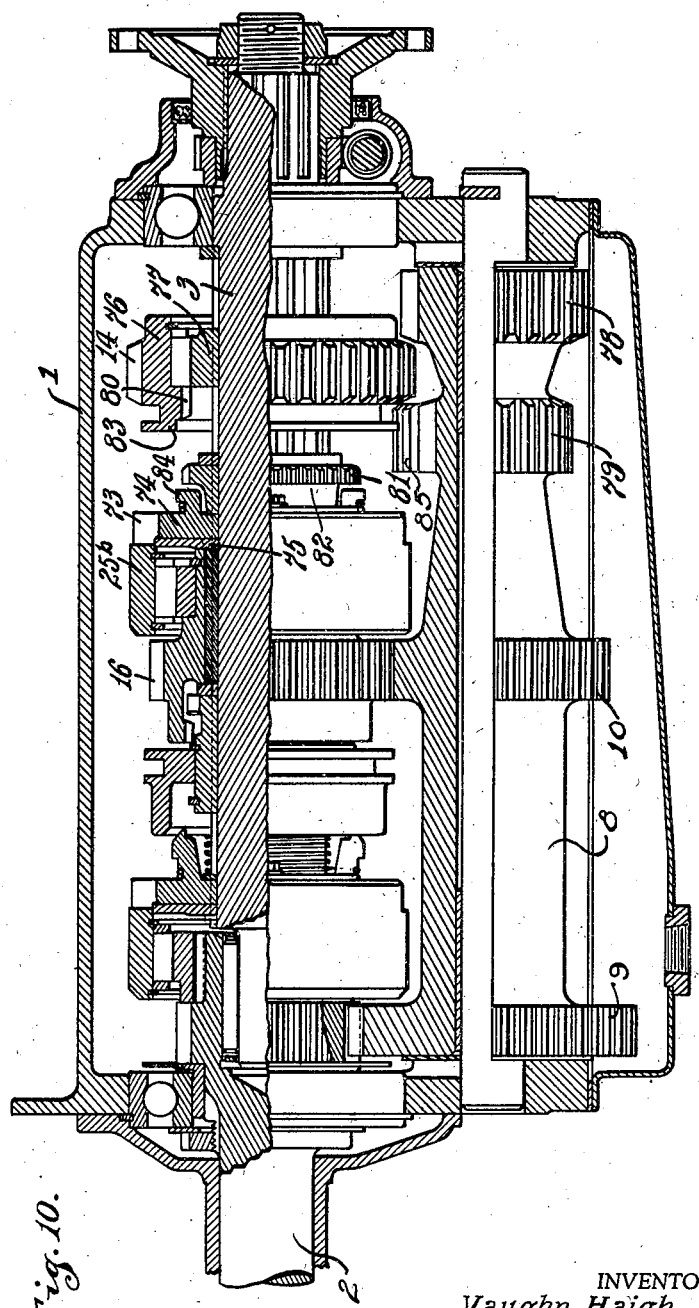

Patented May 2, 1939

2,156,336

UNITED STATES PATENT OFFICE 2,156,336

AUTOMATIC TRANSMISSION

Vaughn Haigh, Muncie, Ind., assignor, by mesne assignments, to Borg-Warner Corporation, a corporation of Illinois Application August 26, 1933, Serial No. 686,874

14 Claims. (Cl. 74—336)

My invention relates to improvements in automatic speed changing mechanisms and particularly to automatic speed changing mechanisms especially adapted for automotive vehicles.

More specifically my invention relates to means for automatically connecting or disconnecting the different speed gears of the transmission to the driven shaft of said transmission as the speed of the driven shaft is increased or decreased by the variations of the speed of the propelling engine and manipulative means for effecting a change in the driving speed ratio and operable for locking out said automatic speed changing mechanism.

One of the objects of my invention is to provide a transmission of the gear type wherein the "gear shift" may be accomplished automatically in accordance with the speed developed by the vehicle to be propelled and the load imposed upon the engine.

For the purpose of disclosing my invention, I have illustrated certain embodiments thereof in the accompanying three sheets of drawings, in which:

Fig. 1 is a longitudinal sectional view of a transmission embodying one form of my invention;

Fig. 2 is a side elevation partly in section of one of the automatic clutches for connecting the gearing to the driven shaft;

Fig. 3 is an end view thereof;

Fig. 4 is a further elevation partly in section of the structure illustrated in Fig. 2;

Fig. 5 is a detail sectional view of a form of overrunning clutch used in connection with my invention;

Fig. 6 is a side elevation, more or less diagrammatic, of the control mechanism for my transmission;

Fig. 7 is a longitudinal detail sectional view showing the shifting rods and forks;

Fig. 8 is a detail section on the line 8—8 of Fig. 6;

Fig. 9 is a detail elevation of the shifting handle; and

Fig. 10 is a longitudinal sectional view of a modified form of my transmission.

In the structure illustrated in Figs. 1 to 9, referring to Fig. 1, I provide the usual housing or casing 1, into the front end of which extends the driving shaft 2, which is adapted to be driven through the instrumentality of the usual clutch mechanism by the engine. A driven shaft 3 extends through the housing or casing, being supported at its rear end in the rear wall of the casing by means of a suitable ball bearing 4 and piloted as at 5 in the rear end of the driving shaft 2. This driven shaft 3 is provided with suitable means 6 for connecting the same to the usual propeller shaft of an automobile. A countershaft 7 is mounted beneath the shafts 2 and 3 and is provided with a spindle 8 having formed thereon suitable gears 9, 10, 11 and 12. This countershaft, or the spindle thereon, is driven by the meshing engagement of the gear 9 with a driving gear 13 formed on the rear end of the driving shaft 2.

The driven shaft 3 has splined thereon a gear 14 axially movable on but rotatable with the shaft 3 which, when moved to the left, looking at Fig. 1, and into mesh with the gear 11, constitutes the low speed drive for the shaft 3. This gear 14 when moved to the right, looking at Fig. 1, into engagement with an idler 13 in turn meshing with the gear 12, constitutes a reverse drive for the shaft 3. This gear 14 has its hub provided with an annular grove 15 adapted to receive a suitable shifting fork.

A second speed gear 16 is mounted on the shaft 3 and is in constant mesh with the gear 10 on the countershaft. The hub 17 of this gear 16 is rotatably mounted on a sleeve suitably splined on the shaft 3, and this hub and sleeve are secured against axial movement by suitable locking rings 18 and 19 secured in grooves in the shaft 3 and abutting the ends of the hub.

Associated with the gear 16 is an overrunning clutch of the structure illustrated in end elevation in Fig. 5. Fig. 5 is specifically an end elevation of the high speed overrunning clutch, but the structures of the two clutches are similar with the exception of certain details for connecting the inner member of the overrunning clutch to the part to be driven thereby. This clutch comprises an inner member 20 having a plurality of peripheral cam surfaces 21, in the present instance eight, formed on its outer surface. Riding on these cam surfaces are rollers 22 adapted to be biased into their engaging position by coiled springs 23 interposed between the rollers and radial projections 24 on the inner member. The rollers are adapted to ride up the cam surfaces and engage the inner surface of an outer member 25 of the clutch.

Referring now to the overrunning clutch associated with the gear 16, the inner member 20ª is keyed on the hub 17 of the gear 16. The outer member 25ª surrounds the inner member with the rollers 22ª interposed therebetween, and this outer member is provided with an annular flange 26 having internal teeth 27. A sliding collar 28 is splined on the shaft 3 and is provided with external teeth 29 adapted under predetermined conditons to mesh with the teeth 27 for locking the outer member 25ª to the shaft 3. The hub of this collar is provided with an annular groove 30 adapted to receive a suitable shifting fork. It is thus seen that with the collar 28 shifted to engage the teeth 27 and 29, the gear 16 is drivingly connected through a one-way drive to the shaft 3 through the medium of the overrunning clutch. The arrangement of the overrunning clutch is such that in event the shaft 3 operates at a greater speed than the gear 16, the shaft will be disconnected from the gear. When, however, the gear becomes the driving member for the shaft 3, the overrunning clutch will connect the two parts together.

For directly connecting the shafts 2 and 3 whereby the shaft 3 may be driven at "high" speed, I provide an automatic clutch which is adapted automatically to engage when the speed of rotation of the shaft 3 attains a predetermined rate and which will automatically disengage when the speed of the shaft 3 attains a lower predetermined rate. This automatic clutch also includes an overrunning clutch which, under certain conditions, will permit the shaft 3 to overrun the shaft 2, thereby providing for "free wheeling" of the vehicle under certain conditions. In constructing this automatic clutch, I mount on the shaft 2 the inner member 20 of the overrunning clutch of the structure illustrated in Fig. 5. The outer member 25 of the overrunning clutch surrounds the inner member, having interposed therebetween the rollers 22, and this outer member has an inwardly extending flange 31 which overhangs the outer member to prevent axial displacement, in one direction, of the outer member. This outer member 25 is extended beyond the inner member 22 and overhangs the driven shaft 3, being provided in its periphery with grooves or slots 32 preferably two in number and arranged diametrically opposite one another. The side walls of these slots preferably taper inwardly as at 33. This extension comprises one portion of one member of the automatic clutch for connecting the shafts 2 and 3 together.

A hub member 34 of the opposite member of the automatic clutch is splined on the driven shaft 3, and this hub member in its face is provided with a pair of radial grooves 35 adapted to receive the radially movable latches or bolts 36 which are held against lateral displacement by a suitable cover plate 37.

These latches or bolts 36 (see Fig. 3) are provided at their upper ends with reduced portions 38 having their side walls slightly tapered as at 39, and the reduced portions, when the latches move outwardly under the influence of centrifugal force, are adapted to engage in the notches 32 of the member 25 to thereby lock the shafts 2 and 3 together. The latches are biased inwardly by suitable springs 40. There is preferably a pair of these springs 40 which consist of wire springs wrapped around studs 41 extending from the hub member 34. The ends of these springs overlap projections 42 on the latches 38, and the springs are so tensioned as to maintain the latches in their retracted position.

It will be noted that I preferably provide a pair of these springs and that their ends preferably ride in grooves on the projections 42. With this arangement, and with the tension of the springs set at the determined point when the speed of the shaft 3 reaches the desired point, the centrifugal force of the latches 36 will be sufficient to overcome the tension of the springs permitting the latches to fly out and eventually move into the recesses 32, thus locking the member 25 to the shaft 3 and driving the shaft 3 from the shaft 2 through the overrunning clutch. The clutch will remain engaged as long as the speed of the shaft 3 is maintained above a lower predetermined rate. If the speed of the shaft 3 drops below the desired point, the springs 40 will again retract the latches 38, thus disconnecting the shafts 2 and 3.

The radially movable bolts 36 will tend to fly outwardly under the influence of centrifugal force and against the tension of spring 40, after the speed of rotation of the driven member of the automatic clutch carried by the driven shaft 3 attains a predetermined rate. The circumferential faces 36' of the bolts are tapered so that radial outward movement of the bolts 36 cannot take place until the speed of rotation of the member of the automatic clutch is approximately synchronized. The tapered faces of the bolts cause the driving member of the automatic clutch to overrun the driven member, causing the bolts 36 to "jump" or "ratchet over" the slot 32 until approximate synchronization of the speed of such members takes place, such as by closing of the engine throttle to reduce engine speed, when the bolts 36 will be projected into the slots 32.

The bolts 36 will remain in their projected position until the tension of the springs 40 is able to overcome the centrifugal force of the bolts, resulting from rotation of the hub 34 and until the torque between the bolt and the shell 25 is released such as incident to closing of the engine throttle. The tension of the springs 40 will be unable to overcome the effects of centrifugal force for the purpose of moving the bolts 36 inwardly until the speed of rotation of the hub 34 is measurably less than the speed of rotation at which the bolts 36 tend to fly outwardly on account of the shifting of the center of gravity away from the axis of rotation.

The above described construction is arranged to provide for an automatic "shift" from second to high and high to second speeds only. In starting the car, the operator first will shift into "low" by shifting gear 14 into mesh with gear 11, and when the desired speed has been obtained, the operator then shifts the collar 28 to mesh the teeth 27 and 29, at the same time shifting gear 14 out of mesh with gear 11. This will drive the drive shaft 3 at second speed, leaving the second speed drive connected.

As the speed of the shaft 3 is increased beyond a predetermined or critical rate, the automatic clutch will eventually operate to connect the shafts 2 and 3 directly or drive in high. It will be noted that while the shaft 3 is being driven directly from shaft 2, the speed thereof will be greater than the speed of the gear 16, and the overrunning clutch including the members 20ª and 25ª, will operate to leave the gear 16 unaffected. If while driving in high, the momentum of the car is such that the shaft 3 is operating at a greater speed than the shaft 2, the shaft 3 will be disconnected from the shaft 2 through the overrunning clutch including the members 22 and 25. In other words, the structure is so arranged as to permit "free wheeling" either in second or high speed.

There are occasions where it is desired to maintain the second speed drive even when the shaft 3 is being rotated above the predetermined speed for which the automatic clutch is set to operate. Such occasions may happen in ascending a grade where it is desired to obtain the benefit of the increased power of second speed and at the same time propel the car at a greater speed than is ordinarily desired in second speed. Other occasions will likewise occur.

In order, therefore, to prevent the automatic clutch from operating under such conditions, I provide means for locking out the automatic clutch. Furthermore, there may be occasions when it is desired to lock out the free wheeling clutch in second speed. For instance, in descending a steep grade, it may be desired to rely on the engine compression, in second speed, for braking the car, and if no means were provided for locking out the second speed overrunning clutch, this could not be accomplished.

To this end, therefore, I provide means for locking out the second speed overrunning clutch. For accomplishing this, I provide on the driven shaft 3 a sliding collar 43. This collar is capable of a certain amount of lateral movement on the shaft 3 and is provided with radial clutch teeth 44 adapted to mesh with inwardly projecting clutch teeth 45 formed in an overhanging part 46 on the hub 17. The sleeve is biased toward normal or disengaging position by a coiled spring 47. Mounted on this collar 43 and having a certain amount of lost motion thereon, is an operating collar 48 having an annular groove 49 for receiving a shifting fork.

The collar 48 has a limited sliding movement on the sleeve 43, being adapted to abut against suitable stops 50 and 51 on the sleeve. This collar 48 is provided with an overhanging portion or annular flange 52 having a cammed portion 53 adapted to ride on a cammed portion 54 on the projections 42, and it will be noted that when the collar 48 is moved to the left, looking at Fig. 1, the engagement of this flange 52 with the projections 42 will force the projections and with them the latch members 38 radially inwardly to break the high speed driving connection between the shafts or will hold the bolts 38 in their retracted position for locking out the automatic speed changing mechanism.

Therefore, if it is desired to operate in second speed and drive the shaft 3 at a greater speed than normally desired by shifting the collar 48 to the left, looking at Fig. 1, the flange 52 will lock the latches out of engaging position, thus preventing centrifugal force from operating the automatic clutch irrespective of the speed at which the shaft 3 is driven. If, furthermore, it is desired to lock out the second speed overrunning clutch, a further shift of the collar 48 to the left, looking at Fig. 1, will engage the collar with the stop 51, moving the sleeve 43 and thus engaging the teeth 44 and 45 so that the sleeve or hub 19 of the gear 16 will be directly connected through these teeth to the shaft 3.

For the purpose of manipulating the above parts, I have shown one means within the control of the operator, in Figs. 7 to 9. Referring first to Fig. 7, it will be noted that there is provided a shift rod 55 having a fork 56 engaging in the groove 15 of the gear 14. A second shift rod 57 is provided with a fork 58 engaging in the groove 30 of the clutch member 28 and a third shift rod 59 is provided with a fork 60 engaging in the groove 49 of the shift collar 48. The shift rod 59 is adapted to be moved to throw the collar 48 into its operative position by means of a suitable bell crank lever 61 operated by a foot pedal 62 within convenient reach of the operator of the automobile.

Movement of the foot pedal 62 half way to the floor will, through the intermediary of lever 61, rod 59 and fork 60, shift collar 48 to the left, looking at Fig. 1, to lock the radially movable bolts 36 in their retracted position for locking out the automatic speed changing mechanism 10 or for moving the bolts 36 radially inwardly should they be in their projected position at the time, to effect a forced shift from automatic "high" to "second". Movement of the foot pedal 62 entirely to the floor will further shift collar 48 and sleeve 43 to the left to mesh teeth 44 and 45 to effect a positive second speed drive and lock out the second speed overrunning clutch.

It is understood that during the time the second speed overrunning clutch is locked out, the operator maintains his foot on the pedal 62. As soon as he removes his foot from this pedal 62, the coiled spring 47 will return the parts to non-operative position. The shift rod 55 is connected by a suitable lever 63 with a second shift rod 67 mounted in a casing 65 secured on the dash or instrument board of the vehicle, and the shift rod 57 is connected by a suitable lever 66 with a second shift rod 64 arranged beside the rod 67. An operating shifting member 68 is arranged between the two and is provided with a projection 69 adapted to engage in, depending upon the direction of rotation, slots 70 and 71 formed in sleeve members pinned respectively to the shift rods 64 and 67. Thus, by rotating the handle 72 of the rod 68 to the right, the projection 69 will engage the shift rod 67, and then by pulling on the handle, the gear 14 will be shifted into low speed; likewise, by pushing on the handle, the gear 14 will be shifted into "reverse". By rotating the handle 72 in the opposite direction and pulling on the same, the collar 28 will mesh the teeth 27 and 29 for drivingly connecting the shaft 3 through the medium of the overrunning clutch with the second speed gear 16.

In Fig. 10 I have illustrated a structure wherein in addition to providing an automatic clutch between second and high speeds, I also provide an automatic clutch between first and second speeds. In this structure the parts so far as they appertain to the automatic and lock-out features between second and high speeds are the same. However, the outer member 25b of the overrunning clutch for the second speed gear is provided with an extension having notches 73 corresponding in function and construction to the notches 32. Centrifugally operated latches or bolts 74, corresponding in construction and operation to the latches 38, are mounted on a hub member 75 keyed to the shaft 3. By this construction, when the shaft 3 reaches a predetermined speed, the centrifugally operated latch member 74 will move outwardly, engaging in the notches 73 to connect the second speed gear 16 to the shaft 3 through the overrunning clutch.

For low and reverse speeds, the low or first speed gear 14 is mounted on the outer member 76 of an overrunning clutch, the inner member 77 of which is splined to the shaft. In the construction illustrated in Fig. 10, the low speed gear 14 is adapted to be axially moved to the right, looking at Fig. 10, to mesh with the low speed gear 78 on the countershaft, and it will be noted that when it is so moved, the low speed drive is through an overrunning clutch. This is necessary as the low speed gear is left in mesh after having once started the vehicle, and the "shift" of second and high speeds is done automatically. Under these circumstances, the gear 14, when the shaft is driven through second or high speed, operates at a lower speed than the shaft; thus it is therefore necessary to provide the overrunning clutch.

When it is desired to shift into "reverse", the gear member 14 and its associated parts are shifted to the left, looking at Fig. 10, until the teeth of the gear mesh with an idler 85 in constant mesh with the reverse gear 79. As an overrunning clutch is interposed between the gear 14 and its shaft 3, it is necessary, when operating in "reverse", to lock out the overrunning clutch. I therefore provide on the inner periphery of the member 76, internal teeth 80 which, when the gear 14 is moved into engagement with the reverse idler, also mesh with the teeth 81 on the clutch member 82 splined on the shaft 3. It is thus seen that a direct drive is established between the member 76 and the shaft 3. Furthermore, in making this clutch engagement, a portion 83 on the member 76 engages the projections 84 on the latch member 74 to prevent these latch members from moving outwardly under the action of centrifugal force, when the transmission is in reverse gear.

While several specific embodiments of my invention have been illustrated and described, it must be appreciated that many modifications may be made in the construction thereof without departing from the scope of the invention, and for that reason I do not desire to be limited to any particular form or arrangement except in so far as such limitations are included in the following claims.

I claim:

1. An automatic transmission having in combination a driving shaft, a driven shaft, a gear rotatable on said driven shaft and driven from said driving shaft through a train of gears, an overrunning clutch for connecting said gear to the driven shaft to provide a one-way drive between said shafts for driving the driven shaft at a reduced rate of speed, an automatic clutch comprising a driving member rotatable with the driving shaft and having a bolt-receiving recess, a driven member rotatable with the driven shaft, and a movable bolt on said driven member and adapted to be radially projected into said recess under the influence of centrifugal force responsive to a predetermined speed of rotation of said driven shaft to connect said members for effecting an automatic change in the driving speed ratio, whereby the driven shaft will be driven directly and in synchronism with said driving shaft, a slidable sleeve splined to the driven shaft and adapted to be locked to said gear, a collar freely mounted on said sleeve engageable with said bolt upon movement relative to said sleeve to move said bolt out of said recess against the influence of centrifugal force for breaking the direct drive between said shafts, and manual means for initially moving said collar to move the same relative to said sleeve and for further moving said collar with said sleeve for locking the same to said gear to provide a two-way drive between said shafts for driving said driven shaft at a reduced rate of speed.

2. In a device of the class described, the combination of a driven shaft, an overrunning clutch for connecting the same to a low speed gear to provide a one-way drive therebetween, an automatic clutch operable responsive to a predetermined speed of rotation of said driven shaft for connecting the same to a high speed gear, and progressively operable means for rendering said automatic clutch inoperable thereby to disconnect the driven shaft from said high speed gear without disconnecting said shaft from said overrunning clutch and for subsequently locking said driven shaft to said low speed gear to provide a two-way drive therebetween.

3. An automatic transmission having in combination a driving shaft, a driven shaft, an automatic clutch having a member carried by each of said shafts, a gear rotatable on said driven shaft and driven from said driving shaft through a train of gears, an overrunning clutch for connecting said gear to said driven shaft to provide a one-way reduced drive between said shafts, a radially movable bolt operable responsive to a predetermined speed of rotation of said driven shaft for interconnecting said members of said automatic clutch to provide a direct drive between said shafts, a sleeve slidably splined to said driven shaft and adapted to be locked to said gear to provide a two-way reduced drive between said shafts, a collar having a limited sliding movement on said sleeve and adapted to move said bolt for breaking the direct driving connection between said shafts, and means for progressively shifting said collar and said sleeve.

4. A transmission having in combination a driven shaft, a low speed gear rotatably mounted thereon, an overrunning clutch for connecting said shaft to said gear to provide a one-way drive therebetween, an automatic clutch operable responsive to a predetermined speed of rotation of said shaft for connecting the same to a high speed gear, a clutch operable for locking said low speed gear to said shaft, and means progressively operable for disconnecting said shaft from the high speed gear without disconnecting said shaft from said overrunning clutch, and for operating said clutch to lock the shaft to said low speed gear for providing a two-way drive therebetween.

5. A transmission having in combination a driven shaft, a low speed gear rotatably mounted thereon and having a positive clutch member and an overrunning clutch member, slidable clutch members rotatable with said shaft for connecting the same with said gear to provide either a one-way or a two-way drive therebetween, and an automatic clutch operable responsive to a predetermined speed of rotation of said driven shaft for connecting the same to a high speed gear, and means shiftable for disconnecting said driven shaft from said high speed gear and shiftable further for moving one of said sliding clutch members into engagement with said positive clutch member to provide a two-way drive between said low speed gear and said shaft.

6. A transmission having in combination a driving shaft, a driven shaft, gearing for driving the driven shaft at a reduced rate of speed, an overrunning clutch for connecting said gearing to said driven shaft to provide a one-way drive therebetween, a positive clutch for connecting said gearing to said driven shaft to provide a two-way drive therebetween, an automatic clutch operable responsive to a predetermined speed of rotation of the driven shaft for connecting said shafts to drive the driven shaft in synchronism with the driving shaft, and manipulative means progressively operable for locking out said automatic clutch without breaking the one-way driving connection between said shafts and for subsequently actuating said positive clutch to effect a two-way drive between said gearing and said driven shaft.

7. A transmission having in combination a driving shaft, a driven shaft, gearing for driving the driven shaft at a reduced rate of speed, an automatic clutch operable responsive to a predetermined speed of rotation of said driven shaft to connect said shafts for driving the driven shaft in synchronism with said driving shaft, an overrunning clutch operable for effecting a one-way drive between said gearing and said driven shaft so that said automatic clutch is free to operate, a positive clutch operable for effecting a two-way drive between said gearing and said driven shaft so that said automatic clutch is locked out, and means for rendering said positive clutch operable without regard to the operable condition of said automatic clutch.

8. A transmission having in combination a driving shaft, a driven shaft, gearing driven with one of said shafts and adapted to be connected to the other of said shafts for driving the same at a reduced rate of speed, an overrunning clutch operable for providing a one-way drive between said gearing and said last mentioned shaft, a positive clutch operable for providing a two-way drive between said gearing and said last mentioned shaft, an automatic clutch operable responsive to a predetermined speed of rotation of said driven shaft for connecting the same directly to said driving shaft, and means for locking out said automatic clutch when said driven shaft is operating at a speed above said predetermined speed before changing the driving connection between said gearing and said shaft from a one-way drive to a two-way drive.

9. A transmission having in combination a driving shaft, a driven shaft, gearing driven by the driving shaft and adapted to be connected to the driven shaft for driving the same at a reduced speed ratio, an overrunning clutch operable for effecting a one-way drive between said gearing and said driven shaft, a positive clutch operable for effecting a two-way drive between said gearing and said driven shaft, an automatic clutch operable responsive to a predetermined speed of rotation of said driven shaft for directly connecting said driving and driven shafts, and means operable for locking out the automatic clutch when said driven shaft is operating at a speed above said predetermined speed for effecting a change in the driving speed ratio from a direct drive to a reduced one-way drive, said means being further operable for subsequently effecting a two-way drive between said gearing and said driven shaft.

10. A transmission having in combination a driving shaft, a driven shaft, a driving connection between said shafts comprising speed reduction gearing and an overrunning clutch, an automatic clutch operable responsive to a predetermined speed of rotation of said driven shaft for directly connecting the same to said driving shaft and for shunting the gearing and overrunning clutch out of the driving connection between said shafts, a positive clutch adapted to cooperate with the gearing for shunting the overrunning clutch out of the driving connection between said shafts, and means for locking out said automatic clutch when said driven shaft is operating at a speed above said predetermined speed before shifting said positive clutch into the driving connection between said shafts.

11. A transmission having in combination a driving shaft, a driven shaft, gearing driven by the driving shaft and adapted to be connected to the driven shaft, an overrunning clutch operable for connecting said gearing to said driven shaft, an automatic clutch operable for directly connecting said driven and driving shafts, manipulative means for connecting said overrunning clutch to said driven shaft to provide a one-way drive between said gearing and said driven shaft, and whereby said automatic clutch will be operable after the speed of rotation of said driven shaft attains a predetermined rate, a positive clutch operable for providing a two-way drive between said gearing and said driven shaft, means operable for locking out said automatic clutch, and auxiliary manipulative means for progressively actuating said locking out means and said positive clutch.

12. Transmission mechanism having in combination driving and driven shafts, a centrifugally actuated clutch having a member operatively associated with each of said shafts, means including an overrunning clutch affording a one-way driving connection between said shafts for driving said clutch members initially at different rates, one of said clutch members being provided with a driving shoulder, the other of said clutch members being provided with a centrifugally movable bolt operable, upon the attainment by said driven shaft of a predetermined rate of speed, to engage said driving shoulder for directly connecting said clutch members for driving said driven shaft through the same and around said overrunning clutch, means for preventing the movement of said bolt into operative engagement with said driving shoulder until said clutch members are brought to an approximately synchronous speed, said first-named means having associated therewith a two-way clutch operable for affording a two-way driving connection between said shafts for rotating said clutch members at relatively fixed different rates whereby said centrifugally actuated clutch will be effectively rendered inoperative, and a shiftable member upon initial movement thereof being engageable with said bolt for moving the same out of operative engagement with said driving shoulder to disconnect said clutch members and upon further movement in the same direction being adapted to render said two-way clutch effective.

13. In a device of the class described, the combination of driving and driven shafts, means including an overrunning clutch for drivingly connecting said driven shaft to said driving shaft to provide a relatively low speed one-way drive therebetween, means including an automatic clutch operable responsive to a predetermined speed of rotation of at least one of said shafts for drivingly connecting said driven shaft to said driving shaft to provide a relatively high speed drive therebetween, and means operable for progressively rendering said automatic clutch inoperable thereby to prevent the driving connection of said driven shaft to said driving shaft for said relatively high speed drive without disconnecting said driven shaft from said overrunning clutch and for subsequently locking said driven shaft in driving connection to said driving shaft to provide a relatively low speed two-way drive therebetween of the same speed ratio as that of the first said relatively low speed drive.

14. In a device of the class described, the combination of driving and driven shafts, means including an overrunning clutch for drivingly connecting said driven shaft to said driving shaft to provide a relatively low speed one-way drive therebetween, means including an automatic clutch operable responsive to a predetermined speed of rotation of at least one of said shafts for drivingly connecting said driven shaft to said driving shaft to provide a relatively high speed drive therebetween, said automatic clutch comprising a pair of relatively engageable clutching members, and means operable to relatively displace the members of said automatic clutch for progressively rendering said automatic clutch inoperative thereby to prevent the driving connection of said driven shaft to said driving shaft for said relatively high speed drive without disconnecting said driven shaft from said overrunning clutch and for subsequently locking said driven shaft in driving connection to said driving shaft to provide a relatively low speed two-way drive therebetween of the same speed ratio as that of the first said relatively low speed drive.

VAUGHN HAIGH.